(12) United States Patent
Chan et al.

(10) Patent No.: US 7,080,075 B1
(45) Date of Patent: Jul. 18, 2006

(54) DYNAMIC REMASTERING FOR A SUBSET OF NODES IN A CLUSTER ENVIRONMENT

(75) Inventors: Wilson Wai Shun Chan, San Mateo, CA (US); Angelo Pruscino, Los Altos, CA (US); Stefan Roesch, San Mateo, CA (US); Michael Zoll, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/024,347

(22) Filed: Dec. 27, 2004

(51) Int. Cl.
*G06F 17/30* (2006.01)
*G06F 17/40* (2006.01)
*G06F 15/16* (2006.01)
*G06F 15/173* (2006.01)
*G06F 15/177* (2006.01)

(52) U.S. Cl. .............................. 707/8; 707/9; 709/208; 709/209; 709/222; 709/223

(58) Field of Classification Search .................... 707/2, 707/3, 8, 10, 102, 200, 9; 709/1, 208, 209, 709/222, 223
See application file for complete search history.

(56) References Cited

U.S. PATENT DOCUMENTS

| 5,991,768 | A |   | 11/1999 | Sun et al. |
| 6,014,669 | A |   | 1/2000 | Slaughter et al. |
| 6,058,389 | A | * | 5/2000 | Chandra et al. ................ 707/1 |
| 6,081,900 | A | * | 6/2000 | Subramaniam et al. ........ 726/19 |
| 6,108,654 | A | * | 8/2000 | Chan et al. ..................... 707/8 |
| 6,272,491 | B1 |   | 8/2001 | Chan et al. |
| 6,453,404 | B1 |   | 9/2002 | Bereznyi et al. |
| 6,529,906 | B1 |   | 3/2003 | Chan |
| 2002/0194015 | A1 |   | 12/2002 | Gordon et al. |
| 2004/0243578 | A1 |   | 12/2004 | Chan et al. |
| 2005/0149540 | A1 |   | 7/2005 | Chan et al. |

OTHER PUBLICATIONS

European Patent Office, "Communication pursuant to Article 96(2) EPC," Dated Nov. 2, 2005, 6 pages.
Current Claims, EP 99 968 071.3, 8 pages.
Oracle Corporation, "Oracle8i Supplied Packages Reference, Release 8.1.5," Title page, Feb. 1999, located at http://www.csee.umbc.edu/help/oracle8/server.815/a68001/title.htm, 2 pages.

(Continued)

*Primary Examiner*—Shahid Alam
(74) *Attorney, Agent, or Firm*—Hickman Palermo Truong & Becker, LLP

(57) ABSTRACT

Techniques are provided for mastering resources by assigning resources to mastery-eligible-sets. The resources that are assigned to a mastery-eligible-set may be mastered only at nodes that belong to the mastery-eligible-set. The membership of a mastery-eligible-set for a given set of related resources may be established based on which nodes have the highest affinity for the given set of related resources. Resource usage may be monitored, and the system may be periodically reconfigured, by changing membership of the mastery-eligible-sets, based on the usage information.

20 Claims, 3 Drawing Sheets

OTHER PUBLICATIONS

Oracle Corporation, "Oracle8i Supplied Packages Reference, Release 8.1.5," Table of Contents, Feb. 1999, located at http://www.csee.umbc.edu/help/oracle8/server.815/a68001/toc.htm, 22 pages.

Oracle Corporation, "DBMS_OFFLINE_OG Oracle8i Supplied Packages Reference, Release 8.1.5," Feb. 1999, located at http://www.csee.umbc.edu/help/oracle8/server.815/a68001/dbms_off.htm, 7 pages.

Dye, Charles, Oracle Distributed Systems, Chapter 12—"Multi-master Replication" (O'Reilly & Associates, Inc. © Apr. 1999).

Kirkland, Bob, Domino System Administration, Chapter 9—"Replication" (New Riders Publishing © 2000).

Mahapatra, Tushar et al., Oracle Parallel Processing, Chapter 12—"Application Fallover" (O'Reilly & Associates, Inc. © Aug. 2000).

* cited by examiner

DYNAMIC REMASTERING FOR A SUBSET OF NODES IN A CLUSTER ENVIRONMENT

FIELD OF THE INVENTION

The present invention relates to multi-node systems and, more specifically, to remastering resources within multi-node systems.

BACKGROUND

Database servers use resources while executing transactions. Even though resources may be shared between database servers, many resources may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager.

FIG. 1 is a block diagram of a multiple-node computer system 100. Each node is executing an instance of a database server and a portion of a distributed lock management system 132. Specifically, the illustrated system includes three nodes 102, 112 and 122 on which reside database servers 104, 114 and 124, respectively, and lock manager units 106, 116 and 126, respectively. Database servers 104, 114 and 124 have access to the same database 120. The database 120 resides on a disk 118 that contains multiple blocks of data. Disk 118 generally represents one or more persistent storage devices that may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, the communication mechanism will be different than if the nodes 102, 112 and 122 correspond to clusters of processors and memory within a multi-processing machine.

Before any of database servers 104, 114 and 124 can access a resource shared with the other database servers, it must obtain the appropriate lock on the resource from the distributed lock management system 132. Such a resource may be, for example, one or more blocks of disk 118 on which data from database 120 is stored.

Lock management system 132 stores data structures that indicate the locks held by database servers 104, 114 and 124 on the resources shared by the database servers. If one database server requests a lock on a resource while another database server has a lock on the resource, then the distributed lock management system 132 must determine whether the requested lock is consistent with the granted lock. If the requested lock is not consistent with the granted lock, then the requester must wait until the database server holding the granted lock releases the granted lock.

According to one approach, lock management system 132 maintains one master resource object for every resource managed by lock management system 132, and includes one lock manager unit for each node that contains a database server. The master resource object for a particular resource stores, among other things, an indication of all locks that have been granted on or requested for the particular resource. The master resource object for each resource resides within only one of the lock manager units 106, 116 and 126.

The node on which a lock manager unit resides is referred to as the "master node" (or simply "master") of the resources whose master resource objects are managed by that lock manager unit. Thus, if the master resource object for a resource R1 is managed by lock manager unit 106, then node 102 is the master of resource R1.

Changing the master of a lock resource from one node to another is referred to as "remastering" the lock resource. Various techniques have been developed for efficiently performing remastering operations. Such techniques are described, for example, in the following documents, the entire contents of which are incorporated herein:

U.S. Pat. No. 6,272,491, entitled "Method And System For Mastering Locks In A Multiple Server Database System";

U.S. Pat. No. 6,529,906, entitled "Techniques For DLM Optimization With Re-Mastering Events";

U.S. patent application Ser. No. 09/967,856, entitled "Techniques For Adding A Master In A Distributed Database Without Suspending Database Operations At Extant Master Sites"; and U.S. patent application Ser. No. 10/832,527, entitled "Techniques for Multiple Window Resource Remastering Among Nodes of a Cluster".

There are a variety of reasons that it may be useful to remaster a resource. For example, it costs significantly less for processes to interact with a lock management unit that resides on their same local node, than to interact with lock management units on other nodes. Therefore, one reason to remaster a resource is to establish the master of the resource to be the node that most frequently requests locks on the resource.

The access patterns of individual resources are often just a reflection of the access patterns of the larger sets of related resources to which the individual resources belong. In the context of a database server, for example, the access patterns of individual disk blocks may just be a reflection of the access patterns of the tables whose data is stored on those disk blocks.

For example, consider a database system where ten database servers are used to access a shared database. Assume further that the users that have permission to access a particular table of the database usually connect to the database through a particular database server. In this case, it is likely that the data blocks that store the rows of that particular table will be primarily accessed by the node on which that particular database server is running. Under these circumstances, it would be inefficient to have mastery of those data blocks spread evenly across all ten of the database servers.

To avoid such inefficiency, the particular node may be assigned to be the master of all data blocks of that particular table. Under these circumstances, lock operations involving that table would not incur the overhead of inter-node communication, as long as all access to the table was made through that particular database server.

Unfortunately, access patterns are not always simple. For example, assume that the users that have permission to access the particular table of the database usually connect to the database through three of the ten database servers. Under these circumstances, it would be inefficient to have those data blocks mastered evenly across all ten of the database servers. However, it may also be inefficient to have all of those data blocks mastered at only one of the three database servers. The greater the percentage of accesses that are made through the two database servers that are not the master, the greater the inefficiency of restricting mastery to the one database server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Mastery-Eligible-Sets

As used herein, the term "mastery-eligible-set" refers to a set of nodes, within a multi-node system, that are considered to be eligible to master a particular set of resources. According to one embodiment, resources are mapped to mastery-eligible-sets. The mastery-eligible-set to which a given resource is mapped dictates which nodes, in the multi-node system, are eligible to be the master of the resource.

Figure 1:
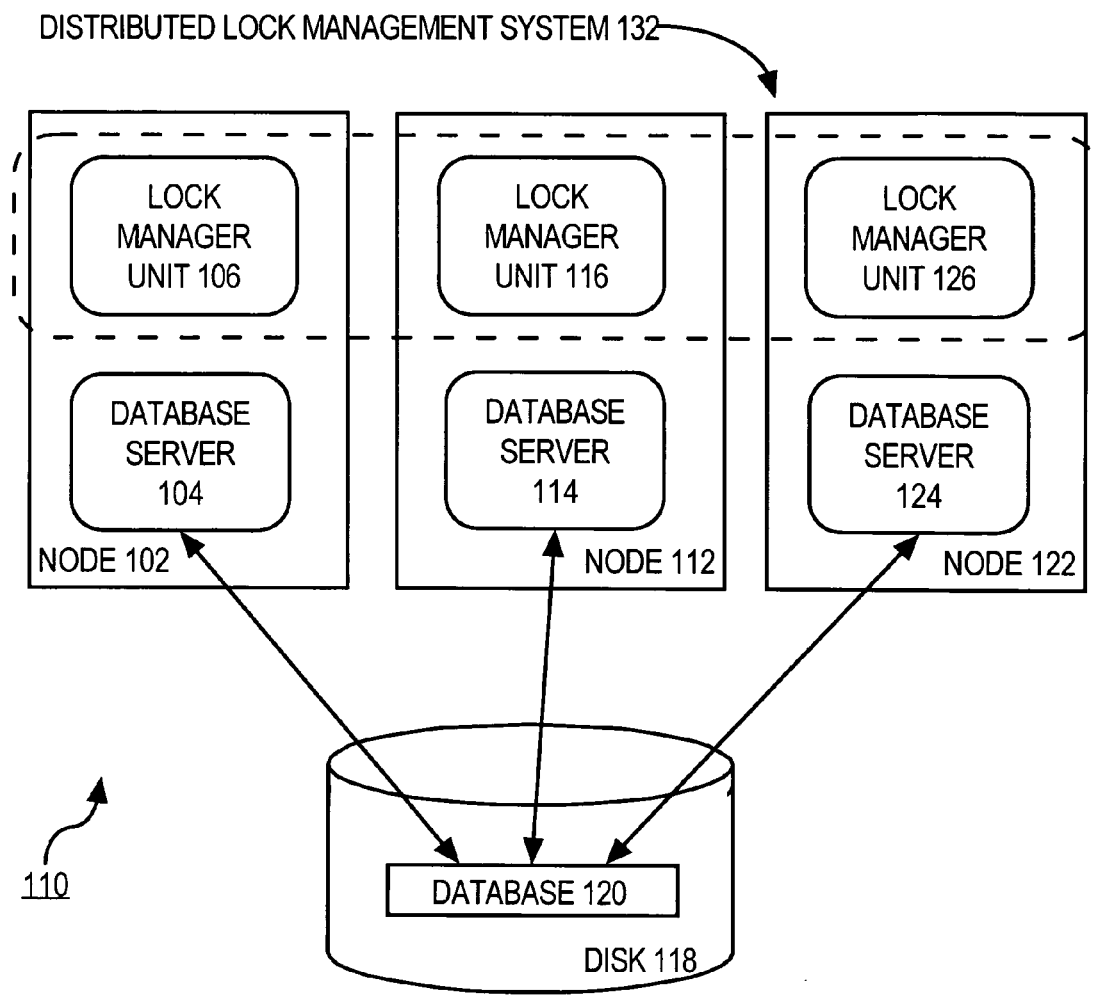
FIG. 1 is a block diagram of a multiple-node computer system 100.
Figure 2:
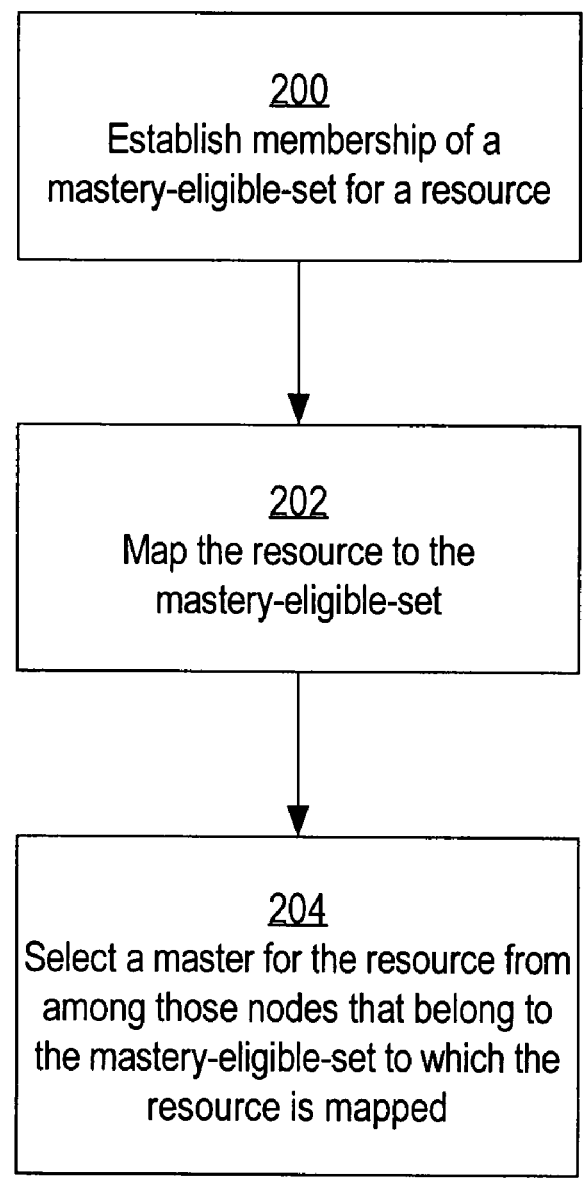
FIG. 2 is a flowchart showing steps for assigning masters to resources according to an embodiment of the invention.

FIG. 2 is a flowchart showing steps for assigning masters to resources according to an embodiment of the invention. In step 200, the membership of a mastery-eligible-set for a resource is established. As shall be described in greater detail hereafter, the mastery-eligible-set for the resource may be established based on the degree of affinity between the resource and the various nodes in the multi-node system. In step 202, the resource is mapped to the mastery-eligible-set. In step 204, a master for the resource is selected from among those nodes that belong to the mastery-eligible-set to which the resource is mapped.

For example, assume that a system includes ten nodes (N1 to N10). Assume that a resource R1 has been mapped to a mastery-eligible-set S1 that includes nodes N1, N3 and N7. Based on this resource-to-mastery-eligible-set mapping, only nodes N1, N3 and N7 would be eligible to master resource R1. Thus, at any given time, one of N1, N3 or N7 would be the master of R1. If remastering conditions are satisfied, R1 may be remastered to a different one of N1, N3 or N7. However, as long as R1 is mapped to S1, no node other than N1, N3 or N7 is eligible to master R1.

Related-Resource-Sets

As mentioned above, individual resources may belong to larger sets of related resources. As used herein, the term "related-resource-set" refers to a set of resources that are related to each other in some manner. For example, the disk blocks that store data for the same larger construct, such as a table or file, may be considered to belong to the same related-resource-set.

According to one embodiment, the resource-to-mastery-eligible-set mapping, described above, may be created by (1) establishing related-resource-sets, (2) establishing mastery-eligible-sets, and (3) establishing a mapping between related-resource-sets and mastery-eligible-sets. In such an embodiment, only those nodes that belong to the mastery-eligible-set to which a related-resource-set is mapped are eligible to master the resources that belong to the related-resource-set.

Establishing Related-Resource-Sets

Related-resource-sets may be established in a variety of ways. For example, related-resource-sets may be established based on the relationship between resources and higher-level constructs. Thus, within the context of a database system, related-resource-sets may be established according to the rule that all data blocks that belong to the same logical container belong to the same related-resource-set. Based on this rule, the related-resource-sets may be mapped to mastery-eligible-sets by establishing a mapping between the logical containers within the database, and the mastery-eligible-sets.

Alternatively, related-resource-sets may be established based on some other characteristic about the resources. For example, in the context of a file system, related-resource-sets may be established based on the creator of the files, the last modifier of the files, or a designated owner of the files. The related-resource-sets may also be established based on the type of the files. For example, for each user, all spreadsheet documents created by the user may be established as one related-resource-set, while all word processing documents created by the user are established as another related-resource-set.

In embodiments that map related-resource-sets to mastery-eligible-sets, the nodes that are eligible to be the master of a resource would be determined by (1) identifying the related-resource-set to which the resource belongs, (2) inspecting the mapping to determine the mastery-eligible-set to which that related-resource-set is mapped, and (3) determining which nodes are members of that mastery-eligible-set.

In the context of a database system, the nodes that are eligible to be the master of a particular data block may be determined by, for example, (1) identifying the table to which the data block belongs, (2) inspecting a table-to-mastery-eligible-set mapping to determine the mastery-eligible-set to which the table is mapped, and (3) determining which nodes belong to that mastery-eligible-set.

Establishing Mastery-Eligible-Sets

A node that frequently accesses a resource is said to have a high affinity to the resource, whereas a node that never accesses a resource has low affinity to the resource. Affinity may take into account additional factors, such has the speed at which a particular node is able to access a particular resource.

According to one embodiment, the resource-to-eligible-set mapping is established based on the affinity between resources and nodes. To determine the affinity between resources and nodes, accesses to the resources may be monitored to gather access pattern information. The access pattern information may be collected at various levels of granularity. For example, a system may monitor how frequently each node accesses individual disk blocks or, more generally, monitor how frequently each node accesses high-level structures, such as files or logical containers.

After determining the affinity between nodes and resources, the system may automatically establish the mastery-eligible-set for a resource to be all nodes whose affinity for the resource exceeds a predetermined threshold. For example, the mastery-eligible-set for all blocks in a table may be established to be all nodes that accessed the table more than a certain number of times during the most recent monitoring period.

Affinity is just one factor that may be used as criteria for establishing the mastery-eligible-sets for resources. Other factors may include, for example, who owns or manages the nodes, the computing resources of the nodes, etc.

Establishing Mastery-Eligible-Sets—Example

An example shall be given of how mastery-eligible-sets are established in a ten-node system, according to an embodiment of the invention. Initially, statistics are gathered, at a global level, of how many times each of the ten nodes accesses each file that is managed by the system. After a predetermined monitoring period, one of the nodes is selected to be a "reconfiguration coordinator" responsible for coordinating the reconfiguration of the system.

The reconfiguration coordinator then gathers all of the globally gathered access information. Based on the access information for each file, the reconfiguration coordinator determines which nodes qualify to be in the mastery-eligible-set for the file. For example, the reconfiguration coordinator may determine that all nodes that accessed a file more then 100 times during the monitoring period will be in the mastery-eligible-set for the file. For files that were not accessed 100 times by any node, the reconfiguration coordinator may apply a fall-back rule. The fall-back rule may be that all nodes in the system are in the mastery-eligible-set for the file. Alternatively, the fall-back rule may be that the node that most frequently accessed the file is the only node in the mastery-eligible-set for the file.

After the mastery-eligible-set for each file has been established by the reconfiguration coordinator, the initial masters are established for the resources that are associated with the files. For example, mastery of the disk blocks that hold data for a given file may be spread evenly among all of the nodes that are in the mastery-eligible-set for the file. Various mechanisms, such as a hash function, may be used to make the final resource-to-master mappings.

The even distribution, of the mastery of resources, among the nodes that belong to an mastery-eligible-set is merely one example of how the ultimate resource-to-master assignment may be performed. Alternatively, the node that accessed a file most frequently may initially be established as the master of all resources associated with the file. The specific technique for making the resource-to-master assignments may vary from implementation to implementation, and may take into account a variety of factors including load balancing and the access frequencies of the nodes that belong to the mastery-eligible-set.

After the initial monitoring period, the initial establishment of mastery-eligible-sets, and the initial resource-to-master assignments, the monitoring, configuration, and remastering operations may be periodically repeated to adapt to changing access patterns. For example, the mastery-eligible-set of a particular file may consist of nodes N1, N3 and N7. During a subsequent monitoring operation, N3 may not access the file at all, while N5 frequently accesses the file. After the subsequent monitoring operation, a subsequent configuration operation may be performed in which N3 is removed from the mastery-eligible-set for that particular file, and N5 is added to the mastery-eligible-set for the particular file.

Remastery Monitoring

Once a resource is mapped to a mastery-eligible-set, one of the members of the mastery-eligible-set is established as the initial master of the resource. Thereafter, mastery of the resource may change from one node in the resource's mastery-eligible-set to another node in the resource's mastery eligible set when certain remastery conditions are satisfied.

The remastering conditions used to determine when a resource should be remastered may vary from implementation to implementation. The techniques described herein are not limited to any particular remastering conditions. In a typical scenario, the system may decide to remaster a resource from one node N1 to another node N2 in response to detecting that the resource is being access much more frequently by processes on N2 than processes on N1.

Unfortunately, the benefits of remastering a resource may be outweighed by the overhead of the remastering operation, particularly if the same resource is remastered frequently. Therefore, according to one embodiment, the system monitors the frequency with which resources are remastered. If the remastering frequency exceeds a predetermined threshold, then the remastering conditions used by the system are changed. The system may change the remastering conditions for a particular resource, or the system may change the remastering conditions that apply to all resources.

Typically, when remastering conditions are changed because the amount of remastering activity has exceeded the threshold, the new remastering conditions are conditions that are more difficult to satisfy than the previous remastering conditions. For example, the new remastering conditions may call for remastering when a non-master of a resource accesses the resource five times as frequently as the master of the resource, whereas the previous remastering conditions called for remastering when the non-master accessed the resource only twice as frequently. As another example, the new remastering conditions may specify that the resource simply cannot be remastered so long as the new remastering conditions are in effect.

After having changed the remastering conditions, it may be desirable to revert back the initial remastering conditions. This may be accomplished, for example, by reverting back to the initial remastering conditions when the remastering activity has fallen below a predetermined threshold for a predetermined period of time. Alternatively, reversion to the initial remastering conditions may occur automatically after a certain period of time has elapsed, or as soon as the amount of remastering activity falls below a certain threshold.

Recovery

Using the resource-to-mastery-eligible-set mapping, it is possible to determine which nodes are eligible to master any given resource. This information is useful in a variety of situations, such as when the system must recover a failed node. Specifically, part of recovery involves determining which resources were mastered by the failed node, and the state of those resources at the time of failure. Until the failed node is recovered, those resources may not be made available.

Based on the resource-to-mastery-eligible-set mapping, it is possible to determine which resources could not possibly have been mastered at the failed node. Specifically, resources that are mapped to mastery-eligible-sets that do not include the failed node could not have been mastered on the failed node. Therefore, it may not be necessary to prevent access to those resources during recovery of the failed node.

Further, because the resource-to-mastery-eligible-set mapping is established based on the affinity of resources to nodes, there is a higher likelihood that the resources mastered by the failed node have high affinity to the failed node, and low affinity to the surviving nodes. Because of the relatively low affinity to the surviving nodes, there is a decreased likelihood that work being performed on the surviving nodes will suffer due to the failure of the failed node.

Hardware Overview

Figure 3:
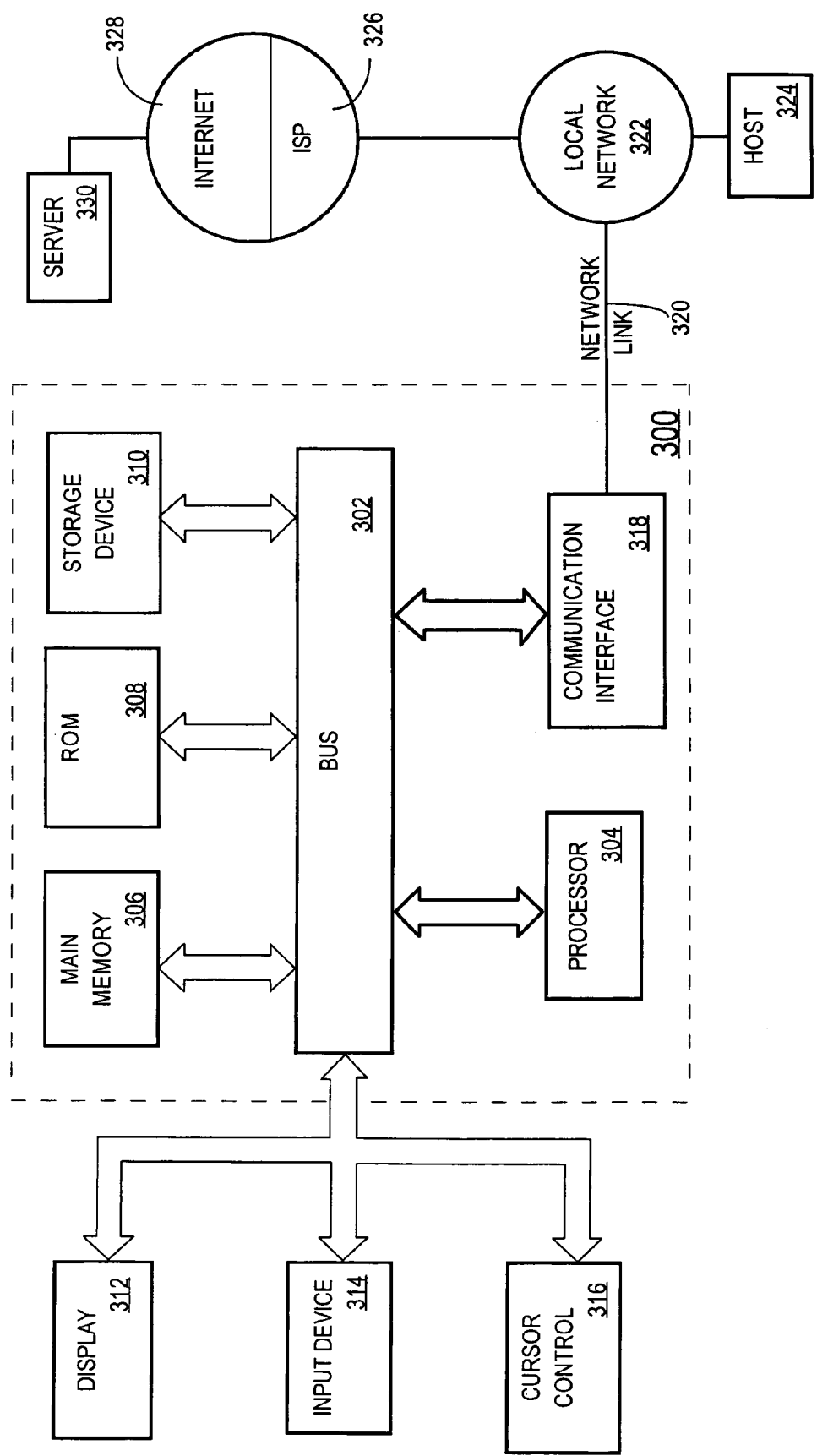
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322.

For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for mastering resources, the method comprising:
within a system that includes a plurality of nodes that have access to a particular resource, establishing a mastery-eligible-set for the particular resource;
wherein the mastery-eligible-set includes two or more nodes of the plurality of nodes;
wherein the mastery-eligible-set does not include all nodes of the plurality of nodes;
allowing the particular resource to be mastered only by a node that is a member of the mastery-eligible-set; and
storing information that indicates which node is master of the particular resource;
wherein the step of establishing the mastery-eligible-set includes monitoring accesses to the resource made by the plurality of nodes establishing the mastery-eligible-set based on the accesses;
wherein the step of establishing the mastery-eligible-set based on the accesses includes establishing, as members of the mastery-eligible-set, all nodes whose access patterns satisfy certain criteria;
wherein the resource is one of many resources that are associated with a higher-level construct; and
wherein the step of monitoring accesses to the resource is performed by monitoring accesses to the higher-level construct.

2. The method of claim 1 wherein:
the resource is one of many resources that are associated with a higher-level construct; and
the step of establishing a mastery-eligible-set for the particular resource is performed by establishing a mastery-eligible-set for the higher-level construct.

3. The method of claim 2 wherein:
the system is a multiple-node database system;
the higher-level construct is a database object; and
the resource is a portion of the database object.

4. The method of claim 3 wherein:
the database object is a container; and
the resource is a data block that stores data contained in the container.

5. The method of claim 4 wherein the container is a table.

6. The method of claim 1 wherein:
the resource is one of many resources that are associated with a higher-level construct; and
the method further comprises initially distributing mastery of the many resources among the various members of the mastery-eligible-set.

7. The method of claim 1 wherein:
the resource is one of many resources that are associated with a higher-level construct; and
the method further comprises initially assigning mastery of the many resources to a single member of the mastery-eligible-set.

8. The method of claim 1 further comprising:
after establishing the mastery-eligible-set for the particular resource, monitoring access patterns within the system; and
based on access patterns within the system, changing membership of the mastery-eligible-set.

9. The method of claim 1 wherein:
the method further comprises establishing a related-resources-set;
the resource is one of many resources within the related-resources-set; and
the step of establishing a mastery-eligible-set for the particular resource is performed by establishing a mastery-eligible-set for the related-resources-set.

10. A method for mastering resources, the method comprising:
within a system that includes a plurality of nodes that have access to a particular resource, establishing a mastery-eligible-set for the particular resource;
wherein the mastery-eligible-set includes two or more nodes of the plurality of nodes;
wherein the mastery-eligible-set does not include all nodes of the plurality of nodes;
allowing the particular resource to be mastered only by a node that is a member of the mastery-eligible-set;
determining whether certain re-mastery conditions are satisfied;

in response to determining that certain re-mastery conditions are satisfied,
re-mastering the resource from a first node of said mastery-eligible-set to a second node of said master-eligible-set;
monitoring how many re-mastery operations are performed;
changing the certain re-mastery conditions if the amount of re-mastery operations exceeds a predetermined threshold; and
storing information that indicates that the second node is master of the resource.

11. A computer-readable storage medium carrying one or more sequences of instructions which, when executed by one or more processors, causes the one or more processors to perform the method recited in claim 1.

12. A computer-readable storage medium carrying one or more sequences of instructions which, when executed by one or more processors, causes the one or more processors to perform the method recited in claim 2.

13. A computer-readable storage medium carrying one or more sequences of instructions which, when executed by one or more processors, causes the one or more processors to perform the method recited in claim 3.

14. A computer-readable storage medium carrying one or more sequences of instructions which, when executed by one or more processors, causes the one or more processors to perform the method recited in claim 4.

15. A computer-readable storage medium carrying one or more sequences of instructions which, when executed by one or more processors, causes the one or more processors to perform the method recited in claim 5.

16. A computer-readable storage medium carrying one or more sequences of instructions which, when executed by one or more processors, causes the one or more processors to perform the method recited in claim 6.

17. A computer-readable storage medium carrying one or more sequences of instructions which, when executed by one or more processors, causes the one or more processors to perform the method recited in claim 7.

18. A computer-readable storage medium carrying one or more sequences of instructions which, when executed by one or more processors, causes the one or more processors to perform the method recited in claim 8.

19. A computer-readable storage medium carrying one or more sequences of instructions which, when executed by one or more processors, causes the one or more processors to perform the method recited in claim 9.

20. A computer-readable storage medium carrying one or more sequences of instructions which, when executed by one or more processors, causes the one or more processors to perform the method recited in claim 10.

* * * * *